United States Patent Office 2,838,522
Patented June 10, 1958

2,838,522
PHTHALIDES

Donald D. Wheeler and David C. Young, Midland, Mich., assignors to The Dow Chemical Company, Midland, Mich., a corporation of Delaware No Drawing. Application April 30, 1956
Serial No. 581,350

7 Claims. (Cl. 260—343.3)

This invention is concerned with 3-thiophthalides and is particularly directed to alkyl, phenyl, and halophenyl 3-thiophthalides and to a method for their preparation.

The compounds of the present invention are represented by the formula

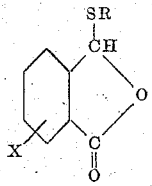

In this and succeeding formulae, R is a member of the group consisting of alkyl, phenyl and halophenyl and X' is a member of the group consisting of chlorine and hydrogen. These new compounds are liquids or solids varying in color from white to yellow, somewhat soluble in many common organic solvents such as benzene, toluene and acetone and substantially insoluble in water. These compounds are active as parasiticides and are adapted to be employed for the control of nematodes. Certain of these compounds are also active as herbicides.

The 3-thiophthalides may be obtained by causing a phthalaldehydic acid having the formula

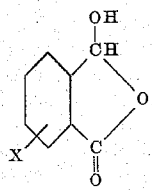

to react with a sulfhydryl compound having the formula RSH to obtain the desired product and water of reaction. The terms "phthalaldehydic acid" and "3-hydroxyphthalide" refer to a compound having the structure

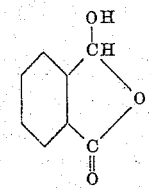

Phthalaldehydic acid is often represented in the literature as having the structure

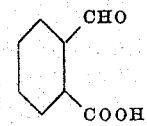

However, the acid employed in this invention and prepared as hereinafter described exists almost entirely in the closed ring, 3-hydroxyphthalide structure, as observed from a study of its infrared absorption spectrum. Infrared data indicate the 3-thiophthalide products also to have a closed ring 3-hydroxyphthalide structure with the open chain ester being formed as a by-product.

In the synthesis, good results are obtained when substantially equimolar proportions or an excess of either reactant are employed. However, phthalaldehydic acid, if used in large excess or under conditions of high temperature, may form an anhydride by-product. The reaction takes place smoothly in the temperature range of from 15° to 150° C. Higher or lower temperatures may be employed but are less desirable from practical considerations. Solvents, such as benzene, diethyl ether and toluene may be employed, if desired. The product obtained is separated from the water of reaction by vaporization of the latter.

In the preferred method of carrying out the reaction, the mixture is heated in the temperature range of 80° to 140° C. under reflux for one to four hours. The refluxing during the early stages may be due to a low boiling mercaptan when the latter is the reactant sulfhydryl compound and during the later stages to the water of reaction. On completion of the heating, the reaction mixture is poured into water or dilute alkaline solution forming a heterogeneous mixture which separates into an aqueout phase and an organic product phase. The aqueous phase is decanted from the organic product and the latter washed with warm water. The crude product, if a liquid, is dissolved in benzene and the resulting solution heated to distill benzene and water and to obtain the desired product as a residue. If the product is a solid, it is filtered from the aqueous medium, washed and dried.

The following examples illustrate the invention but are not to be construed as limiting.

*Example 1.—3-butylthiophthalide*

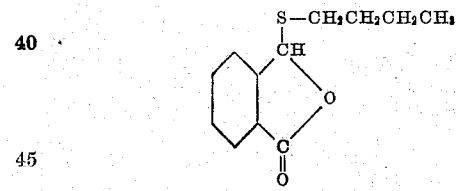

45.1 grams (0.5 mole) of 1-butanethiol and 75.0 grams (0.5 mole) of phthalaldehydic acid were mixed and heated under reflux. As the reaction proceeded, the temperature of the reaction mixture rose from 90° to 130° C. After heating for two hours, the reaction mixture was poured into water whereupon an oil percipitated. The water was decanted from the oil and the latter washed with fresh water. The oil was then extracted from the mixture with benzene and the benzene solution heated to distill water and benzene and to obtain a 3-butylthiophthalide product as residue. The latter, obtained in a yield of 105 grams or 95 percent of theoretical, was a yellow oil having a refractive index $n_D^{20}$ of 1.5472.

*Example 2.—3-secondary-butylthiophthalide*

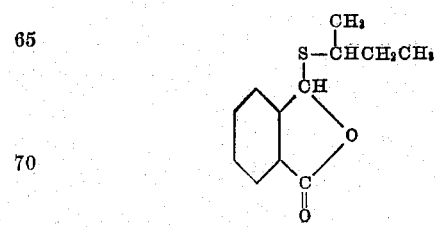

22.5 grams (0.25 mole) of 2-butanethiol and 37.5 grams (0.25 mole) of phthalaldehydic acid were mixed and heated in the temperature range of 85° to 100° C. under reflux for four hours. At the end of this period, the mixture was poured into 700 milliliters of water whereupon an oil precipitated. The latter was extracted from the mixture with benzene and the benzene solution heated to distill water and benzene and to obtain a 3-secondary-butylthiophthalide product as residue. The latter, obtained in an amount of 51 grams or 92 percent of theoretical was an amber-colored oil which crystallized on standing to a solid melting at 45°–47° C.

*Example 3.—3-phenylthiophthalide*

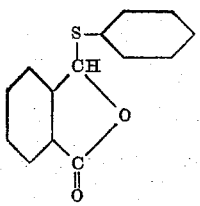

55 grams (0.5 mole) of benzenethiol and 75 grams (0.5 mole) of phthalaldehydic acid were mixed and heated at about 110° C. under reflux for two hours. The mixture was then cooled to 90° C. and poured into 500 milliliters of water whereupon a solid 3-phenylthiophthalide product precipitated. The latter was separated by filtration, washed and dried to obtain a solid melting at 92°–94° C. The product amounted to 115.5 grams or 95.5 percent of theoretical.

*Example 4.—3-(1,1,2,2-tetramethylbutylthio)phthalide*

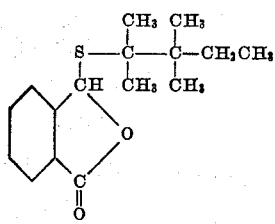

29.2 grams (0.20 mole) of 1,1,2,2-tetramethylbutanethiol and 30.0 grams (0.20 mole) of phthalaldehydic acid were mixed and heated in the temperature range of from 110° to 120° C. for three hours. At the end of this period, the mixture was cooled and poured into 600 milliliters of water whereupon a solid precipitated. The latter was separated by filtration, washed with petroleum ether and dried at about 50° C. and 15 millimeters pressure to obtain a 3-(1,1,2,2-tetramethylbutylthio)phthalide product. The latter was a solid melting at 65°–66° C.

*Example 5.—3-octadecylthiophthalide*

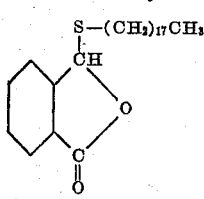

43 grams (0.15 mole) of octadecanethiol and 22.5 grams (0.15 mole) of phthalaldehydic acid were mixed and heated in the temperature range of 120° to 140° C. under reflux. During the heating, water of reaction separated in the reaction mixture. The heating was continued for three hours and the mixture then cooled to 90° C. and poured into 700 milliliters of warm water with a resultant precipitation of an oil. On stirring and gradual cooling of the heterogeneous mixture, the oil solidified. The solid was separated by filtration, washed and dried to obtain 62 grams or a 99 percent yield of a 3-octadecylthiophthalide product melting at 62°–64° C.

*Example 6.—3-dodecylthiophthalide*

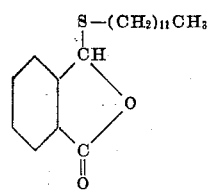

40.5 grams (0.2 mole) of 1-dodecanethiol and 30 grams (0.2 mole) of phthalaldehydic acid were mixed and heated at temperatures of from 105° to 115° C. under reflux for 1.5 hours. The resulting mixture was cooled and poured into 600 milliliters of water whereupon an oil separated. The oil was extracted from the mixture with benzene and the benzene solution distilled to remove the water as a benzene-water azeotrope. The solution was then further distilled to remove benzene solvent and to obtain as a solid residue a 3-dodecylthiophthalide product in a yield of 66 grams or 98.5 percent of theoretical. The latter melted at 36°–38° C.

*Example 7.—3-(4-chlorophenylthio)phthalide*

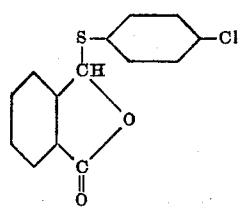

36.0 grams (0.25 mole) of 4-chlorobenzenethiol and 37.5 grams (0.25 mole) of phthalalehydic acid were mixed and heated at 110° C. for 3 hours. At the end of this period, the hot mixture was poured into 700 milliliters of dilute 0.5 percent sodium hydroxide solution whereupon a solid precipitated. The latter was separated by filtration, washed and dried to obtain a 3-(4-chlorophenylthio)phthalide product melting at 116°–118° C. The product amounted to 68 grams or 99 percent of theoretical.

*Example 8*

92 grams (0.5 mole) of x-chlorophthalaldehydic acid (a phthalaldehydic acid containing a chlorine atom in the aromatic ring) and 45 grams (0.5 mole) of 1-butanediol were mixed and heated at about 120° C. under reflux for two hours. At the end of this period, the resulting mixture was cooled and poured into 2 liters of water whereupon an oil separated. The heterogeneous mixture was separated by decanting the water, washing the remaining oil with water and dissolving the oil in 100 milliliters of benzene. The benzene solution was heated to distill first the residual water as a benzene-water azetrope and then the benzene solvent and to obtain as residue a 3-butylthio-x-chlorophthalide product having a refractive index $n_D^{20}$ of 1.5663.

The novel compounds of the present invention have utility as parasiticides and herbicides. They are particularly useful for the control of larval rootknot nematodes. In a representative operation, 3-butylthiophthalide was dispersed in water to prepare a composition containing 10 parts of the phthalide compound per million parts of dispersion. This composition gave substantially complete control of larvae of the rootknot nematode (*meloidogyne* species) contacted therewith.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid and ferric chloride solution, as more fully disclosed and claimed in the copending application of James D. Head and Owen D. Ivins, Serial Number 279,682, filed March 31, 1952, now Patent No. 2,748,162.

The x-chlorophthalaldehydic acid employed in this invention may be prepared by first chlorinating o-xylene in the presence of ferric chloride in the temperature range of from 5° to 15° C. to obtain a ring-chlorinated product, x-chloro-o-xylene. The ring-chlorinated product is then photo-chlorinated to obtain α,α,α,α',α',x-hexachloro-o-xylene and the latter hydrolyzed in a manner similar to that described above for phthalaldehydic acid.

We claim:

1. A 3-thiophthalide having the formula

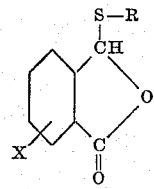

wherein R represents a member of the group consisting of alkyl, phenyl and chlorophenyl and X is a member of the group consisting of chlorine and hydrogen.

2. 3-butylthiophthalide.
3. 3-(1,1,2,2-tetramethylbutylthio)phthalide.
4. 3-octadecylthiophthalide.
5. 3-phenylthiophthalide.
6. 3-(4-chlorophenylthiophthalide).
7. A method for preparing a 3-thiophthalide having the formula

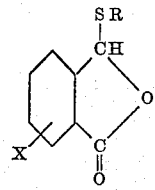

wherein R represents a member of the group consisting of alkyl, phenyl and chlorophenyl and X is a member of the group consisting of chlorine and hydrogen which comprises the step of heating a phthalaldehydic acid and an organic sulfur compound having the formula RSH, wherein R is a hydrocarbon group as above specified, at a temperature of from 80° to 140° C. for a time sufficient to allow completion of the reaction.

References Cited in the file of this patent

Bistrzycki et al.: Helv. Chim. Acta 3, pp. 460–1 (1920).